US000001075H

United States Statutory Invention Registration [19]

[11] Reg. Number: H1075

Kapoor

[43] Published: Jul. 7, 1992

[54] TUNGSTEN HEAVY ALLOYS

[75] Inventor: Deepak Kapoor, Rockaway, N.J.

[73] Assignee: The United States of America as represented by the Secretary of the Army, Washington, D.C.

[21] Appl. No.: 830,215

[22] Filed: Jan. 24, 1992

[51] Int. Cl.[5] ..... C22C 27/04

[52] U.S. Cl. ..... 420/430; 75/248

*Primary Examiner*—Brooks H. Hunt
*Assistant Examiner*—Daniel J. Jenkins
*Attorney, Agent, or Firm*—Anthony T. Lane; Edward Goldberg; Edward F. Costigan

[57] ABSTRACT

Tungsten heavy alloys comprising by weight from about 80 to about 100% tungsten and from about 0 to about 20% of one or more heavy alloying metals are produced by introducing powders of tungsten and the alloying metals into a thermal spray plasma gun, melting the powders in the hot zone of the gun to form a molten alloy and then spraying the molten alloy in droplet form into a collecting chamber where the droplets are solidified, and the resultant alloy in powdered form is collected. The powdered alloy can be further mixed with powdered copper, iron, nickel, cobalt or tantalum and compacted by dynamic or explosive compaction to form a near full density material. Full density materials are produced by further thermomechanical processing of the compact.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TUNGSTEN HEAVY ALLOYS

GOVERNMENTAL INTEREST

The invention described herein may be manufactured, used, and licensed by or for the Government for Government purposes without payment to me of any royalties thereon.

BACKGROUND OF THE INVENTION

1. Field of the Invention

The invention relates to heavy alloys of tungsten and methods of producing such alloys.

2. Description of the Prior Art

Tungsten heavy alloys, which are of great value in counter weights for aircraft, in ballistics, and in other applications, are conventionally produced by liquid phase sintering of mixed elemental powders. Alloys produced by this method are generally two-phase composites consisting of rounded tungsten grains dispersed in an alloy metrix.

The mechanical properties of tungsten heavy alloys are strongly dependent upon their specific microstructural features: for example, the grain size, contiguity, dihedral angle and the volume fraction of the tungsten phase. For a given tungsten content, the optimal microstructure exhibits low contiguity, small grain size, and strong W-W grain boundary and W-matrix interface.

There are serious drawbacks associated with the fabrication of tungsten heavy alloys by liquid phase sintering, one of the principal problems being that such alloys almost always exhibit excessive grain growth.

Solid state sintering is a known means for obtaining finer alloy microstructures. In fact, the microstructure of solid state sintered heavy alloys using tungsten powder of spherical morphology exhibit low continguity and finer grain size in comparison with materials produced by liquid phase sintering. However, the mechanical properties of these solid state-produced materials, especially their ductility, is very low. The probable cause of low ductilities in these materials is the weak interphase and interface boundaries of their composite microstructure.

Improved tungsten heavy alloys and improved methods for producing the same are required.

SUMMARY OF THE INVENTION

1. Objects of the Invention

It is an object of the present invention to provide tungsten heavy alloys with improved microstructural features and mechanical properties in comparison with prior art alloys.

It is another object of the present invention to provide such alloys with fine grain size, low contiguity, strong W-W grain boundary and W-matrix interface.

It is a further object of the present invention to provide tungsten heavy alloys with higher strength and ductility than solid state-processed materials.

Still another object of the present invention is to provide methods for producing and fabricating tungsten heavy alloys exhibiting the properties described hereinabove.

2. Brief Description of the Invention

In keeping with the foregoing objects and others which will become hereinafter aparent, the present invention resides, briefly stated, in the use of plasma rapid solidification technology to fabricate improved tungsten/tungsten alloys of spherical morphology. The composition of the alloys by weight is based on the following generic formula:

$$W_{100-x}\text{—(Mo, Ta, Nb, Hf, Re, Cr)}_x$$

The alloys are produced by introducing elemental or alloy powders into a thermal spray plasma gun, melting the powders in the hot zone of the gun and then spraying the molten material into a collecting chamber where they are cooled by the gas in the chamber, whereupon the resulting powder is collected.

DETAILED DESCRIPTION OF THE PREFERRED EMBODIMENTS

As used herein, the phrase "tungsten heavy alloys" refers to alloys of tungsten which have a density greater than 13 g/cc. To produce the novel tungsten heavy alloys, well-mixed metallic powder comprising from about 80 to about 99% by weight tungsten and from about 1 to about 20% by weight of at least one alloying metal selected from the group consisting of molybdenum, tantalum, niobium, hafnium, rhenium, and chromium is fed by internal or external feed into a thermal spray plasma kgun, for example, a Baystate Model PG-100 plasma gun (Baystate Co., Westboro, Mass.). That gun has a power rating of 28 klowatts and an internal feed nozzle.

The ionized gas plume in a thermal spray plasma gun can reach temperatures of 10,000° Kelvin and is particularly suitable for melting tungsten, which has the highest melting point of any metal (3410° C.).

The mixed metallic powder is passed rapidly through the gas plume of the plasma gun, which plume may comprise ionized inert gases, such as argon, together with a small amount of helium or hydrogen. The powder melts almost instantaneously in the extremely hot gas plume, becoming a stream of molten metal alloy droplets.

The molten alloy is then sprayed in droplet form into a collecting chamber having an atmosphere composed of one or more relatively cool, inert gases, for example, argon, helium or nitrogen. The temperature of the atmosphere in the chamber is prefereably ambient or near-ambient, but may be any temperature low enough to cause rapid solidification of the metal droplets. The molten alloy droplets solidify or "freeze" into tungsten alloy powder granules in the collecting chamber, and the powder is collected. The resultant powder has an average grain size of from about 5 to about 30um, and preferably from about 15 to about 25 um.

The tungsten alloy powders are further treated in a heated hydrogen-containing atmosphere, preferably at about 600°-900° C., to thoroughly clean and reduce any surface oxides. The clean alloy powders can then be intermixed with elemental or alloy powders of at least one metal selected from the group consisting of copper, iron, nickel, cobalt and tantalum in a weight ratio of from about 90 to about 100% tungsten alloy powder and from about 1 to about 10% of the other metal powders.

The intermixed powder may be compacted by dynamic or explosive compaction to form near full density metallic compacts. Dynamic or explosive compaction produces a very small amount of incipient melting around the tungsten particles for a very short time. The presence of this liquid strongly improves the interface strength, but since the quantity of the melt and the time period is extremely small, any measurable grain growth of tungsten is prevented.

The near full density compact can be further thermomechanically processed by, for example, extrusion, swaging or rolling to improve the properties of the material.

The fully dense tungsten heavy alloy materials produced according to the foregoing process exhibit a fine-grained microstructure, low continguity and improved interface strength and ductility in comparison with prior art materials. The novel tungsten heavy alloys are extremely valuable for kinetic energy penetrator applications, and may substantially improve the performance of kinetic energy warheads.

It has thus been shown that there are provided compositions and methods which achieve the various objects of the invention and which are well adapted to meet the conditions of practical use.

As various possible embodiments might be made of the above invention, and as various changes might be made in the embodiments set forth above, it is to be understood that all matters herein described are to be interpreted as illustrative and not in a limiting sense.

What is claimed is:

1. In an improved tungsten heavy alloy having a density greater than 15g/cc, the improvement consisting essentially of said tungsten alloy containing up to about 20% by weight of either molybdenum, tantalum, niobium, hafnium, rhenium or chrominum and mixtures thereof, said alloy being of spherical shape having an average grain size between about 5 and 30 um.

2. The improved tungsten alloy of claim 1 in powder form containing up to at least 10% by weight of either copper, iron, nickle, cobalt or tantalum forming a full density material having comparatively fine-grained microstructure, low contiguity, greater interface strength and ductility relative to known tungsten alloys of the art.

* * * * *